US009069633B2

(12) United States Patent
Manula et al.

(10) Patent No.: US 9,069,633 B2
(45) Date of Patent: Jun. 30, 2015

(54) PROXY QUEUE PAIR FOR OFFLOADING

(71) Applicant: Oracle International Corporation, Redwood City, CA (US)

(72) Inventors: Brian Edward Manula, Oslo (NO); Haakon Ording Bugge, Oslo (NO); Magne Vigulf Sandven, Ski (NO)

(73) Assignee: Oracle America, Inc., Redwood Shores, CA (US)

( * ) Notice: Subject to any disclaimer, the term of this patent is extended or adjusted under 35 U.S.C. 154(b) by 260 days.

(21) Appl. No.: 13/721,649

(22) Filed: Dec. 20, 2012

(65) Prior Publication Data
US 2014/0181823 A1 Jun. 26, 2014

(51) Int. Cl.
*G06F 9/54* (2006.01)

(52) U.S. Cl.
CPC .......... *G06F 9/546* (2013.01); *G06F 2209/548* (2013.01); *G06F 2209/509* (2013.01)

(58) Field of Classification Search
CPC ... H04L 69/161; H04L 67/1097; H04L 69/12; H04L 69/163; H04L 49/90
USPC ......... 709/250, 200, 201, 213, 220, 203, 231, 709/238
See application file for complete search history.

(56) References Cited

U.S. PATENT DOCUMENTS

| | | |
|---|---|---|
| 6,459,698 B1 | 10/2002 | Acharya |
| 6,563,790 B1 | 5/2003 | Yu et al. |
| 6,741,559 B1 | 5/2004 | Smeulders et al. |
| 6,789,143 B2 | 9/2004 | Craddock et al. |
| 6,917,987 B2 | 7/2005 | Parthasarathy et al. |
| 7,136,353 B2 | 11/2006 | Ha et al. |
| 7,330,918 B2 | 2/2008 | Yamamoto et al. |
| 7,496,698 B2 | 2/2009 | Biran et al. |
| 7,609,636 B1 | 10/2009 | Mott |
| 7,742,497 B2 | 6/2010 | Ganti et al. |
| 7,769,015 B2 | 8/2010 | Huang et al. |
| 7,782,805 B1 | 8/2010 | Belhadj et al. |
| 7,817,634 B2 | 10/2010 | Coffman et al. |
| 7,830,919 B1 | 11/2010 | Thompson |
| 7,899,050 B2 | 3/2011 | Craddock et al. |
| 8,244,946 B2 | 8/2012 | Gupta et al. |
| 8,255,475 B2 | 8/2012 | Kagan et al. |

(Continued)

OTHER PUBLICATIONS

Pfister, Gregory; "An Introduction to the Infiniband Architecture"; IBM Enterprise Server Group, Chapter 42, pp. 617-632 (2002).

(Continued)

*Primary Examiner* — Ruolei Zong
(74) *Attorney, Agent, or Firm* — Osha Liang LLP

(57) ABSTRACT

A method for offloading includes a host channel adapter (HCA) receiving a first work request identifying a queue pair (QP), making a first determination that the QP is a proxy QP, and offloading the first work request to a proxy central processing unit (CPU) based on the first determination and based on the first work request satisfying a filter criterion. The HCA further receives a second work request identifying the QP, processes the second work request without offloading based on the QP being a proxy QP and based on the first work request failing to satisfy the filter criterion. The HCA redirects a first completion for the first work request and a second completion for the second work request to the proxy CPU based on the first determination. The proxy CPU processes the first completion and the second completion in order.

20 Claims, 8 Drawing Sheets

(56) References Cited

U.S. PATENT DOCUMENTS

| | | |
|---|---|---|
| 8,259,576 B2 | 9/2012 | Lee et al. |
| 8,259,746 B2 | 9/2012 | Lo et al. |
| 8,274,976 B2 | 9/2012 | Aloni et al. |
| 8,296,386 B1 | 10/2012 | Micalizzi, Jr. |
| 2001/0036185 A1 | 11/2001 | Dempo |
| 2003/0014544 A1* | 1/2003 | Pettey ................ 709/249 |
| 2003/0101158 A1 | 5/2003 | Pinto et al. |
| 2004/0049580 A1* | 3/2004 | Boyd et al. ............ 709/226 |
| 2005/0018669 A1 | 1/2005 | Arndt et al. |
| 2005/0060443 A1 | 3/2005 | Rosner |
| 2005/0135419 A1 | 6/2005 | Pullen et al. |
| 2005/0223118 A1 | 10/2005 | Tucker et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1 | 6/2008 | Shearer |
| 2008/0168194 A1 | 7/2008 | Gregg et al. |
| 2009/0125604 A1 | 5/2009 | Chang et al. |
| 2010/0017535 A1* | 1/2010 | Aloni et al. ............ 709/235 |
| 2010/0023595 A1* | 1/2010 | McMillian et al. ...... 709/212 |
| 2011/0216648 A1 | 9/2011 | Mehrotra et al. |
| 2012/0239832 A1 | 9/2012 | Subramanian et al. |
| 2012/0311597 A1* | 12/2012 | Manula et al. ......... 718/104 |

OTHER PUBLICATIONS

Shanley, Tom; "Infiniband Network Architecture", MindShare, Inc., Chapter 1, pp. 9-24 (2003).

Shanley, Tom; "Infiniband Network Architecture", MindShare, Inc., Chapters 3-6, pp. 31-129 (2003).

Shanley, Tom; "Infiniband Network Architecture", MindShare, Inc., Chapter 13, pp. 259-289 (2003).

* cited by examiner

PROXY QUEUE PAIR FOR OFFLOADING

CROSS-REFERENCE TO RELATED APPLICATIONS

The present application contains subject matter that may be related to the subject matter in the following U.S. Patent Application, which is assigned to a common assignee and is incorporated by reference in its entirety: U.S. patent application Ser. No. 13/149,436, entitled "METHOD AND SYSTEM FOR PROCESSING COMMANDS ON AN INFINIBAND® HOST CHANNEL ADAPTOR."

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router, which connects to another network. The switched fabric is made of a collection of switches, routers, and/or links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using a queue pair. A queue pair includes a send queue and a receive queue. Specifically, in order for a process to send a message to another process, the process posts the message to the send queue. The host channel adapter sends the message in the form of packets to the channel adapter having the receive queue. Each packet that is sent may include a packet sequence number. Logic associated with the receive queue ensures that packets are processed in a particular order using the packet sequence number.

SUMMARY

In general, in one aspect, the invention relates to a method for offloading. The method includes receiving, by a host channel adapter (HCA), a first work request identifying a queue pair (QP), where the QP is associated with an application executing on a host connected to the HCA, making a first determination that the QP is a proxy QP, and offloading, by the HCA, the first work request to a proxy central processing unit (CPU) based on the first determination and based on the first work request satisfying a filter criterion. The method further includes receiving, by the HCA, a second work request identifying the QP, processing, by the HCA, the second work request without offloading based on the QP being a proxy QP and based on the first work request failing to satisfy the filter criterion. The method further includes redirecting a first completion for the first work request and a second completion for the second work request to the proxy CPU based on the first determination, and processing, by the proxy CPU, the first completion and the second completion in order.

In general, in one aspect, the invention relates to a host channel adapter (HCA) for offloading. The HCA includes a proxy central processing unit and a receive module for receiving a first work request identifying a first queue pair (QP), where the first QP is associated with an application executing on a host connected to the HCA, making a first determination that the first QP is a proxy QP, and redirecting the first work request to the proxy CPU on the HCA based on the first determination and based on the first work request satisfying a filter criterion. The receive module is further for receiving a second work request identifying the first QP, and processing the second work request without redirecting to the proxy CPU based on the first determination and based on the first work request failing to satisfy the filter criterion. The HCA further includes a completion module for generating a first completion for the first work request, and generating a second completion for the second work request. The HCA additionally includes a descriptor fetch module for redirecting the first completion and the second completion to the proxy CPU based on the first determination, where the proxy CPU processes the first work request, the first completion, and the second completion.

In general, in one aspect, the invention relates to A system that includes a host comprising an application, and a host channel adapter (HCA), connected to the host. The HCA is for receiving a first work request identifying a queue pair (QP), where the QP is associated with the application, making a first determination that the QP is a proxy QP, offloading the first work request to a proxy central processing unit (CPU) based on the first determination and based on the first work request satisfying a filter criterion, receiving a second work request identifying the QP, processing the second work request without offloading based on the QP being a proxy QP and based on the first work request failing to satisfy the filter criterion, redirecting a first completion for the first work request and a second completion for the second work request to the proxy CPU based on the first determination, and processing, by the proxy CPU, the first completion and the second completion in order.

Other aspects of the invention will be apparent from the following description and the appended claims.

DETAILED DESCRIPTION

Figure 1:
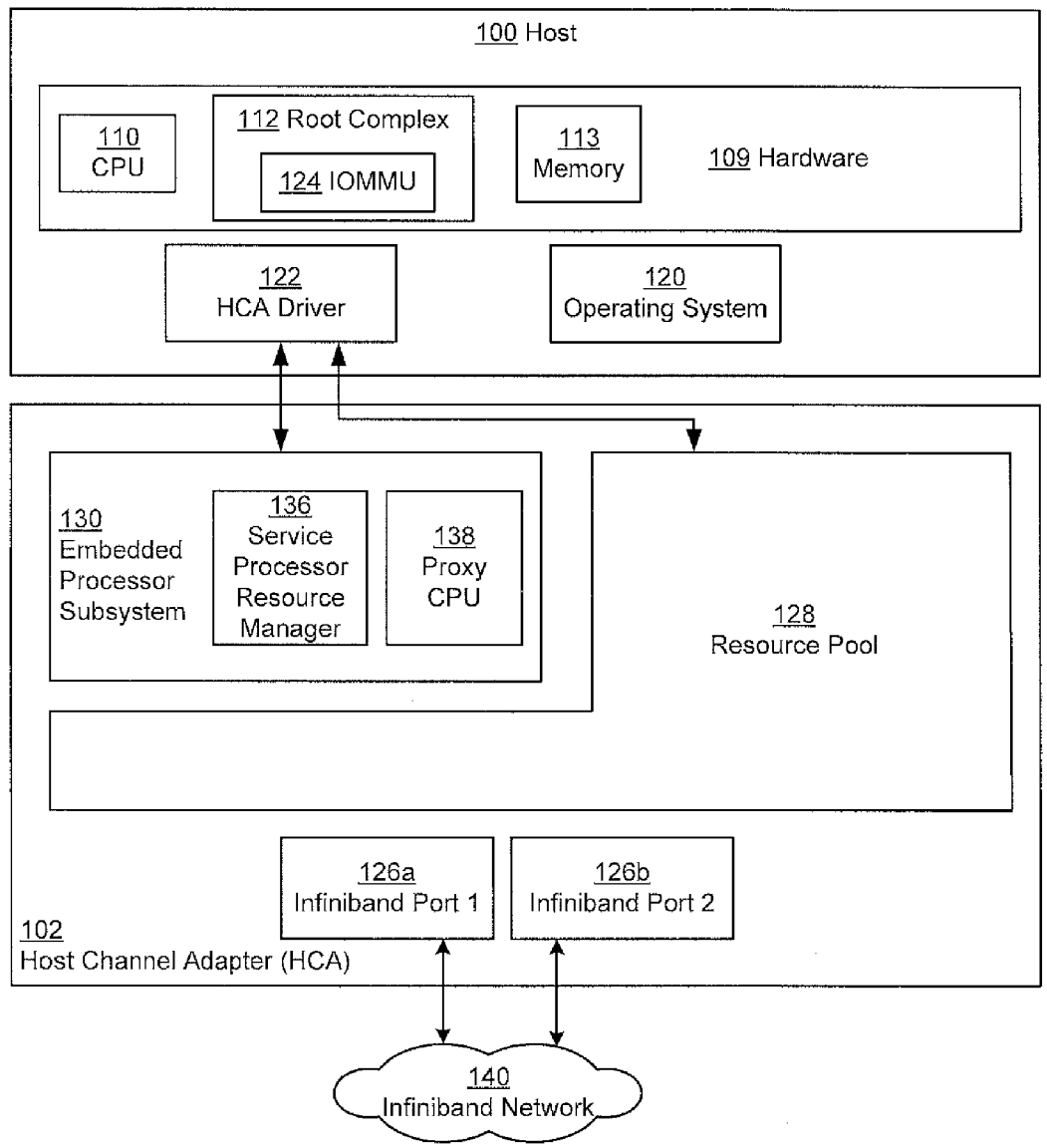
FIGS. 1-3 show schematic diagrams of one or more systems in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for managing the offloading of work requests to a proxy central processing unit (CPU). Specifically, embodiments of the invention provide a mechanism for maintaining information about when to offload a work request for a queue pair (QP) and conforming to QP ordering requirements when work requests are offloaded. Specifically, in one or more embodiments of the invention, a QP requires that messages are processed in accordance with sequence number. When a QP is set to be a proxy QP, embodiments require that the completion queue (CQ) for the QP is also a proxy CQ, resulting in completions for work requests to be offloaded to the proxy CQ. Thus, even when some work request are offloaded and some are not, the completions are issued in order, thereby maintaining ordering requirements. The work request may be a request from a remote requestor from the Infiniband® network or may be based on a new transmission to the Infiniband® network.

By way of an overview, a communication system may include a transmitting system and a receiving system, which each are any type of physical computing device connected to the Infiniband® network. By way of an example of the transmitting system and the receiving system, the transmitting system and/or a receiving system may be a host system, such as the host system described in FIG. 1 or 2 and below. The host system may be an application server, a storage server, any other type of computing device. In one or more embodiments of the invention, for a particular message, the transmitting system is a system that sends the message and the receiving system is a system that receives the message. In other words, the use of the words, "transmitting" and "receiving", refer to the roles of the respective systems for a particular message. The roles may be reversed for another message, such as a response sent from receiving system to transmitting system. For such a message, the receiving system becomes a transmitting system and the transmitting system becomes a receiving system. Thus, communication may be bi-directional in one or more embodiments of the invention. In one or more embodiments of the invention, one or more messages may include a work request. A work request is a request to perform an action.

The work request may be directed to an application or the HCA (discussed below) that is interposed between the device executing the application and the network. Specifically, the transmitting system and the receiving system include a requestor application and a responder application, respectively. The requestor application is a software application that sends the message and the responder application is a software application that receives the message. When the requestor application initiates a send of the message or perform a configuration of the HCA or network, the requestor application issues a command to the HCA. The command is a work request. When the requestor application issues a message, which may or may not be an RDMA read or RDMA write) to the responder application, the message is the work request. For example, the message may explicitly or implicitly indicate an action for the responder application to perform. The HCA connected to the host executing the responder application may be configured to perform at least a portion of the work request. In other words the work request is offloaded to the HCA.

Requestor application and responder application communicate using QPs. Specifically, a QP defines communication channels between the requestor application and the responder application. More specifically, per the Infiniband® protocol, the message has a corresponding send queue and corresponding a receive queue. An application uses the send queue to send messages and the receive queue to receive messages. The send queue and receive queue on the same host that is used by the application to communicate with another application form a QP. Each QP may have a corresponding QP with which to communicate. For example, consider the scenario where application M is communicating with application N. In such a scenario, application M may have QP M, with send queue M and receive queue M, and application N may have QP N, with send queue N and receive queue N. Messages from application M to application N are sent from send queue M to receive queue N. Messages from application N to application M are sent from send queue N to receive queue M. Logic and data structures used by the host system specify which QP on the recipient to use to send messages. Thus, by the requestor application specifying the QP, the requestor application is identifying the responder application to receive the message.

FIG. 1 shows a schematic diagram of a host system (100) in one or more embodiments of the invention. In one or more embodiments of the invention, the host system (100) is any physical computing device. Specifically, the host system (100) includes at least a minimum amount of hardware necessary to process instructions. As shown in FIG. 1, the host system (100) includes a host (100) and a host channel adapter (HCA) (102) in one or more embodiments of the invention. These components are discussed below.

In one or more embodiments of the invention, the host (100) includes an HCA driver (122) and operating system (120), and a root complex (112). In one or more embodiments of the invention, the HCA driver (122) is software that provides an interface to the HCA (102) for the operating system (120). Specifically, when the operating system (120) wants to send work requests to the HCA (102), the operating system (120) invokes a routine in the HCA driver (122).

Continuing with the host, the host (100) includes hardware (109). The hardware (109) may include, for example, a central processing unit (CPU) (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores in one or more embodiments of the invention. In general, the CPU (110) is any device configured to execute instructions on the host (100).

In one or more embodiments of the invention, the memory (113) is any type of hardware device for storage of data. In one or more embodiments of the invention, the memory (113) may be partitioned. In one or more embodiments of the invention, the memory (113) includes functionality to store a send queue (not shown). In one or more embodiments of the invention, a send queue includes functionality to store an ordered list of work request identifiers for work requests for processing by the host channel adapter (102). In one or more embodiments of the invention, the work request identifiers may be the actual work requests and/or references to the work requests stored in memory.

In one or more embodiments of the invention, the root complex (112) includes functionality to connect the CPU and memory subsystem to a peripheral component interconnect (PCI) Express switch fabric. Specifically, in one or more embodiments of the invention, the root complex (112) connects the host (100) to the host channel adapter (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) input/output (I/O) bus to the memory. In one or more embodiments of the invention, the IOMMU (124) includes functionality to translate addresses from one level of abstraction to another.

Continuing with FIG. 1, the host (100) is connected to the host channel adapter (102). In one or more embodiments of the invention, the connection between the host (100) and the host channel adapter (102) may be a PCI express connection. Specifically, the host channel adapter may connect to a PCI express fabric connector on the host.

In one or more embodiments of the invention, the host channel adapter (102) is a hardware device configured to connect the host (100) to the Infiniband® network (140). Specifically, the host channel adapter (102) includes functionality to receive work requests from the host (100) and process the work requests. Processing the work requests may include performing DMA with host memory to obtain and store packet data and to obtain control information, performing any validation required on the packet data, generating packets from the packet data, and sending and receiving packets on the Infiniband® network (140). FIG. 1 shows a schematic diagram of the host channel adapter (102) from the prospective of the host (100). As shown in FIG. 1, the host channel adapter (102) includes at least one Infiniband® port (e.g., Infiniband® port 1 (126a), Infiniband® port 2 (126b)), a resource pool (128), and an embedded processor subsystem (130). Each of the components of the host channel adapter is discussed below.

In one or more embodiments of the invention, an Infiniband® port (e.g., Infiniband® port 1 (126a), Infiniband® port 2 (126b)) is a physical interface connector between the host channel adapter (102) and the Infiniband® network (140). Although FIG. 1 shows two Infiniband® ports, a different number of ports may exist without departing from the invention.

The resource pool (128) is a collection of resources that are required to send and receive packets on the Infiniband® network. Specifically, the resource pool (128) corresponds to the collection of hardware and stored data that is accessible by the host (100) and may be shared among virtual machines on the host (100). The resource pool (128) is discussed in FIG. 3 below.

The embedded processor subsystem includes a service processor resource manager (136) and a proxy CPU (138). The service processor resource manager (136) includes functionality to receive and process the management requests on the host channel adapter. For example, the management requests may be to change the allocation of HCA resources, change the configuration of the HCA, and perform other management of the HCA.

Continuing with FIG. 1, the proxy CPU (138) includes functionality to execute various instructions on behalf of an application (not shown) executing on the host (100). Specifically, the proxy CPU (138) includes functionality to execute the various instructions in place of the application executing the instructions. Thus, the application may offload certain functionality to the proxy CPU (138). The proxy CPU (138) may be associated with memory having the offloaded instructions.

Figure 2:
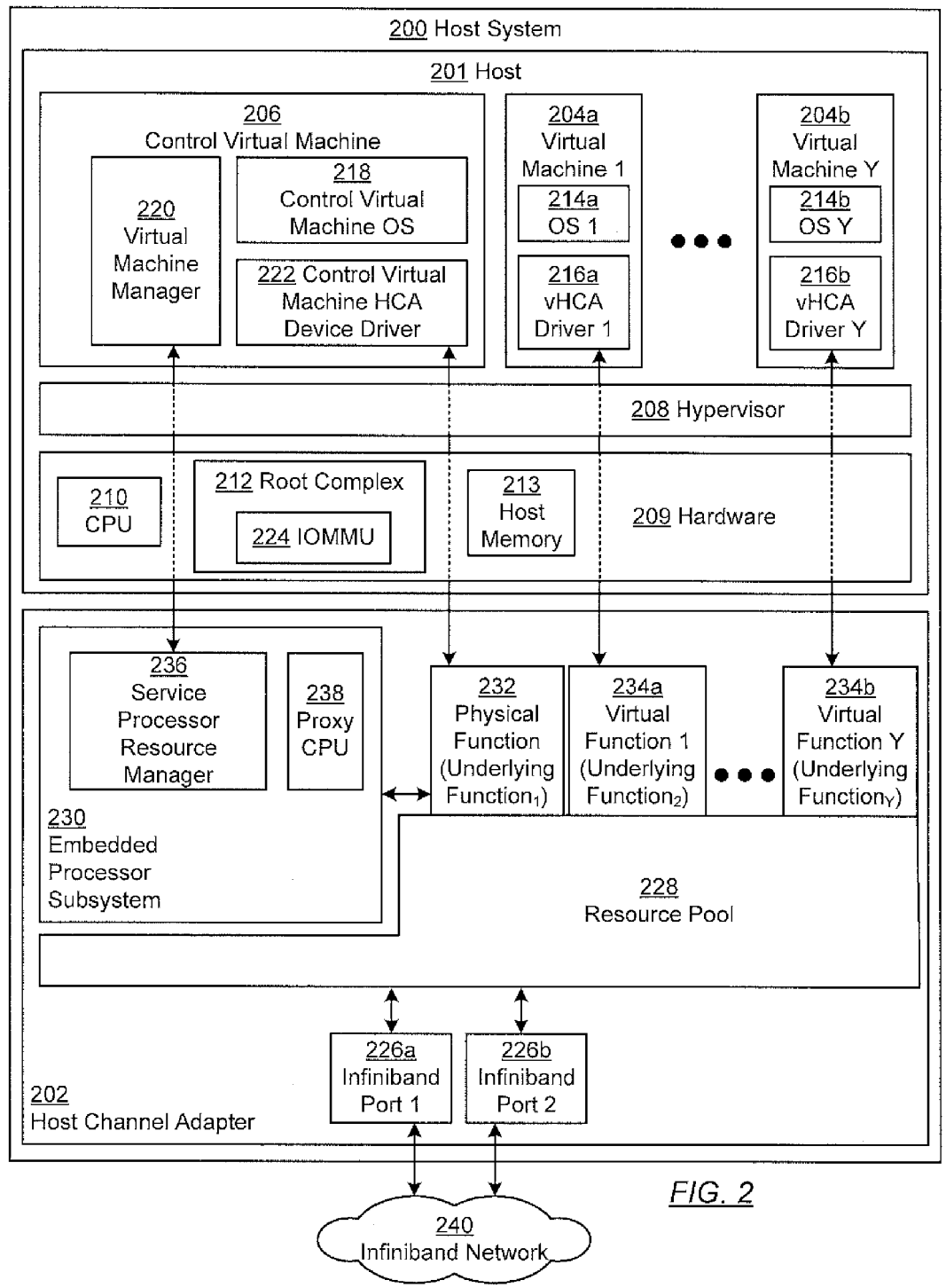

FIG. 2 shows a schematic diagram of a host system (200) when the host system includes virtualization in one or more embodiments of the invention. In one or more embodiments of the invention, the host system (200) is any physical computing device that has virtualized resources. The host system (200) includes at least a minimum amount of hardware necessary to process instructions. As shown in FIG. 2, the host system (200) includes a host (201) and a HCA (202) in one or more embodiments of the invention. These components are discussed below.

In one or more embodiments of the invention, the host (201) includes one or more guest virtual machines (e.g., virtual machine 1 (204a), virtual machine Y (204b)), a control virtual machine (206), a hypervisor (208), and hardware (209). Each of these components is discussed below.

Broadly speaking, the virtual machines (e.g., virtual machine 1 (204a), virtual machine Y (204b), control virtual machine (206)) are distinct operating environments configured to inherit underlying functionality of the host operating system via an abstraction layer. In one or more embodiments of the invention, each virtual machine includes a separate instance of an operating system (e.g., OS 1 (214a), OS Y (214b), Control Virtual Machine Operating System (218)) (OS in FIG. 2). The separate instances of the operating system may be the same type of operating system or different types of operating systems.

Specifically, the guest virtual machine operating system (e.g., OS 1 (214a), OS Y (214b)) operates as if the guest virtual machine operating system is the only operating system on the host (201) and the resources (e.g., processor cycles, memory, resources of the HCA) allocated to the guest virtual machine are the only resources available on the host (201). Thus, the guest virtual machine operating system (e.g., OS 1 (214a), OS Y (214b)) includes functionality to control the operating environment of applications executing in the guest virtual machine using resource allocated to the guest virtual machine. Each virtual machine may be allocated disjoint or non-overlapping physical memory (213).

Many different types of virtual machines exist. For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). Another example is a Solaris™ Container. In such cases, the Solaris™ Container may execute in the host operating system, which may be a Solaris™ operating system. Solaris™ is a trademark of Oracle America, Inc. In one embodiment of the invention, the host operating system may include both virtual machines and virtual execution environments.

In one or more embodiments of the invention, the guest virtual machine includes a virtual HCA device driver (e.g., vHCA driver 1 (216a), vHCA driver Y (216b)). The virtual HCA device driver is software program that provides an interface to HCA (202) for the guest virtual machine operating system. Specifically, when the guest virtual machine operating system wants to send work requests to the HCA (202), the virtual machine operating system invokes a routine in the virtual HCA device driver. In response, the virtual HCA device driver issues work requests to a virtualized device controller (not shown) presented by the hypervisor (208) (discussed below). In turn, the hypervisor (208) includes functionality to transmit the message to the HCA (202).

In addition to the guest virtual machine (e.g., virtual machine 1 (204a), virtual machine Y (204b)), the host (201) also includes a control virtual machine (206). In one or more embodiments of the invention, the control virtual machine (206) has a separate address space and operating system environment than the guest virtual machine (e.g., virtual machine 1 (204a), virtual machine Y (204b)). The control virtual machine (206) includes a control virtual machine operating system (218), a control virtual machine manager (220), and a virtual machine HCA device driver (222). The virtual machine HCA device driver (222) includes functionality similar to the guest virtual machine HCA device drivers (e.g., vHCA driver 1 (216a), vHCA driver Y (216b)) discussed above. The host virtual machine operating system (218) includes functionality to provide an operating environment for software executing in the control virtual machine (206).

In one or more embodiments of the invention, the software executing in the control virtual machine (206) includes a virtual machine manager (220) (discussed below). In one or more embodiments of the invention, the virtual machine manager (220) includes functionality to configure the hypervisor (208), configure the HCA (202), create, remove, and configure guest virtual machines, and perform the management of the host (201). With respect to configuring the HCA, the virtual machine manager includes functionality to send work requests to the HCA to adjust the number of resources allocated to each virtual machine To receive parameter values for performing the above management tasks, the virtual machine manager (220) may include a user interface and/or an application programming interface for communicating with a computer administrator or another program in one or more embodiments of the invention.

Continuing with FIG. 2, the hypervisor (208) includes functionality to control the sharing of hardware resources on the host (201). Specifically, the hypervisor (208) includes functionality to virtualize the physical devices of the host (201) so that more than one operating system may share the same physical device transparently in accordance with one or more embodiments of the invention. Further, the hypervisor (208) controls when the guest virtual machine (e.g., virtual machine 1 (204a), virtual machine Y (204b)) and the control virtual machine (206) are allowed to execute. For example, the hypervisor (208) may be a thin-privileged layer of software that only manages which guest virtual machine or the host virtual machine (206) is executing.

Continuing with the host, the host (201) includes hardware (209), which may include, for example, a central processing unit (210), memory (213), and a root complex (212). The root complex (212) may include an IOMMU (224). The hardware (209), and included components, may be the same as, substantially the same as, or similar to the hardware (109) in FIG. 1, and, thus, the corresponding descriptions from FIG. 1 are incorporated herein. Further, with virtualization, the memory (213) may include a separate send queue for each virtual machine. Alternatively or additionally, multiple virtual machines may share one or more send queues.

Continuing with FIG. 2, the host (201) is connected to the HCA (202). As shown in FIG. 2, the HCA (202) includes at least one Infiniband® port (e.g., Infiniband® port 1 (226a), Infiniband® port 2 (226b)), a resource pool (228), and an embedded processor subsystem (230). The connection between the host (201) and the HCA (202), the HCA (202), the Infiniband® port(s), resource pool (228), and an embedded processor subsystem (230) may be the same as, substantially the same as, or similar to the corresponding like named components discussed above with reference to FIG. 1, and, thus, the corresponding descriptions from FIG. 1 are incorporated herein.

In one or more embodiments of the invention, the sharing of the resource pool (228) is performed using the concepts of physical function and virtual functions. A physical function (232) exposes the actual hardware of the HCA (202) to an operating system. Specifically, by way of the physical function, the control virtual machine operating system (218) may control the HCA. Thus, the physical function allows the control virtual machine (206) to control the HCA (202), such as to disable the HCA (202).

A virtual function (e.g., virtual function 1 (234a), virtual function Y (234b)) exposes a virtualized HCA to a virtual machine. Specifically, the virtual function (e.g., virtual function 1 (234a), virtual function Y (234b)) exposes to the virtual machine operating system only the partition of the resource pool allocated to the virtual machine To the guest virtual machine (e.g., virtual machine 1 (204a), virtual machine Y (204b)), the resources exposed by the virtual function (e.g., virtual function 1 (234a), virtual function Y (234b)) appear as if the resource are the only resources on the HCA (202). Thus, the virtual function (e.g., virtual function 1 (234a), virtual function Y (234b)) allows the virtual machine operating system (e.g., OS 1 (214a), OS Y (214b)) to control the portion of resources allocated to the virtual machine. In other words, a virtual function (e.g., virtual function 1 (234a), virtual function Y (234b)) provides the virtual machine operating system (e.g., OS 1 (214a), OS Y (214b)) the appearance that the virtual machine operating system (e.g., OS 1 (214a), OS Y (214b)) is controlling the HCA (202) as a whole even though the actions of the virtual machine operating system (e.g., OS 1 (214a), OS Y (214b)) does not affect any other virtual function (e.g., virtual function 1 (234a), virtual function Y (234b)).

In one or more embodiments of the invention, the term underlying function (UF) is used to refer generally to either a physical function or a virtual function. Specifically, as used herein, an underlying function may be a physical function or a virtual function.

The embedded processor subsystem (230) corresponds to an embedded processor and logic for managing the HCA (202). The embedded processor subsystem (230) includes a service processor resource manager (236) and a proxy CPU (238). The embedded processor subsystem (230), service processor resource manager (236) and proxy CPU (238) may be the same as, substantially the same as, or similar to the corresponding like named components discussed above with reference to FIG. 1, and, thus, the corresponding descriptions from FIG. 1 are incorporated herein.

Although FIGS. 1 and 2 show the proxy CPU on the HCA, alternatively or additionally, the proxy CPU or a different proxy CPU may be on the host. For example, the proxy CPU may be a dedicated core of the host. In such embodiments of the invention, work requests are routed to the proxy CPU on the host.

Figure 3:
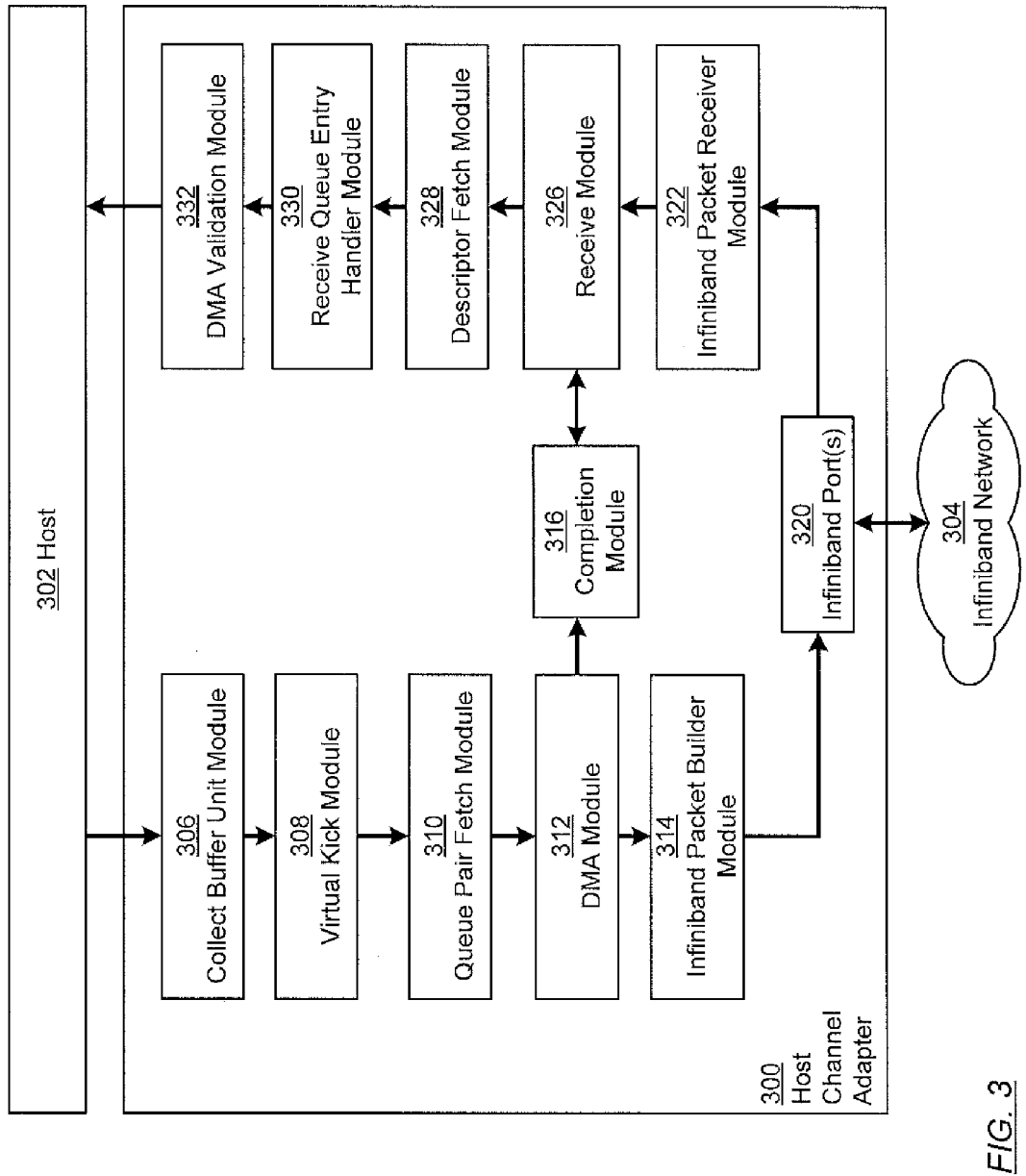

FIG. 3 shows a schematic diagram of a communication adapter when communication adapter is a host channel adapter (300) and the network is an Infiniband® network (304) in one or more embodiments of the invention.

As shown in FIG. 3, the host channel adapter (300) may include a collect buffer unit module (306), a virtual kick module (308), a QP fetch module (310), a direct memory access (DMA) module (312), an Infiniband® packet builder module (314), one or more Infiniband® ports (320), a completion module (316), an Infiniband® packet receiver module (322), a receive module (326), a descriptor fetch module (328), a receive queue entry handler module (330), and a DMA validation module (332). The respective modules correspond to both transmitting processing logic for sending messages on the Infiniband® network (304) and receiving processing logic for receiving messages from the Infiniband® network (304). In one or more embodiments of the invention, the collect buffer unit module (306), virtual kick module (308), QP fetch module (310), direct memory access (DMA) module (312), Infiniband® packet builder module (314), and completion module (316) may be components of the transmitting processing logic. The completion module (316), Infiniband® packet receiver module (322), receive module (326), descriptor fetch module (328), receive queue entry handler module (330), and DMA validation module (332)

may be components of the receiving processing logic. As shown, the completion module (316) may be considered a component of both the transmitting processing logic and the receiving processing logic in one or more embodiments of the invention.

In one or more embodiments of the invention, each module may correspond to hardware and/or firmware. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message. A command or received message may be considered a work request.

The dark arrows between modules show the transmission path of data units between modules as part of processing work requests and received messages in one or more embodiments of the invention. Data units may have other transmission paths (not shown) without departing from the invention. Further, other communication channels and/or additional components of the host channel adapter (300) may exist without departing from the invention. Each of the components of the resource pool is discussed below.

The collect buffer controller module (306) includes functionality to receive work request data from the host and store the work request data on the host channel adapter. Specifically, the collect buffer controller module (306) is connected to the host and configured to receive the work request from the host and store the work request in a buffer. When the work request is received, the collect buffer controller module is configured to issue a kick that indicates that the work request is received.

In one or more embodiments of the invention, the virtual kick module (308) includes functionality to load balance work requests received from applications. Specifically, the virtual kick module is configured to initiate execution of work requests through the remainder of the transmitting processing logic in accordance with a load balancing protocol.

In one or more embodiments of the invention, the QP fetch module (310) includes functionality to obtain QP status information for the QP corresponding to the data unit. Specifically, per the Infiniband® protocol, the message has a corresponding send queue and a receive queue. The send queue and receive queue form a QP. Accordingly, the QP corresponding to the message is the QP corresponding to the data unit in one or more embodiments of the invention. The QP state information may include, for example, sequence number, address of remote receive queue/send queue, whether the QP is allowed to send or allowed to receive, and other state information.

In one or more embodiments of the invention, the DMA module (312) includes functionality to perform DMA with host memory. The DMA module may include functionality to determine whether a work request in a data unit or referenced by a data unit identifies a location in host memory that includes payload. The DMA module may further include functionality to validate that the process sending the work request has necessary permissions to access the location, and to obtain the payload from the host memory, and store the payload in the DMA memory. Specifically, the DMA memory corresponds to a storage unit for storing a payload obtained using DMA.

Continuing with FIG. 3, in one or more embodiments of the invention, the DMA module (312) is connected to an Infiniband® packet builder module (314). In one or more embodiments of the invention, the Infiniband® packet builder module includes functionality to generate one or more packets for each data unit and to initiate transmission of the one or more packets on the Infiniband® network (304) via the Infiniband® port(s) (320). In one or more embodiments of the invention, the Infiniband® packet builder module may include functionality to obtain the payload from a buffer corresponding to the data unit, from the host memory, and from an embedded processor subsystem memory.

In one or more embodiments of the invention, the completion module (316) includes functionality to generate completions for work requests. For example, the completion module may include functionality to manage packets for QPs set in reliable transmission mode. Specifically, in one or more embodiments of the invention, when a QP is in a reliable transmission mode, then the receiving channel adapter of a new packet responds to the new packet with an acknowledgement message indicating that transmission completed or an error message indicating that transmission failed. The completion module (316) includes functionality to manage data units corresponding to packets until an acknowledgement is received or transmission is deemed to have failed (e.g., by a timeout).

In one or more embodiments of the invention, the Infiniband® packet receiver module (322) includes functionality to receive packets from the Infiniband® port(s) (320). In one or more embodiments of the invention, the Infiniband® packet receiver module (322) includes functionality to perform a checksum to verify that the packet is correct, parse the headers of the received packets, and place the payload of the packet in memory. In one or more embodiments of the invention, the Infiniband® packet receiver module (322) includes functionality to obtain the QP state for each packet from a QP state cache. In one or more embodiments of the invention, the Infiniband® packet receiver module includes functionality to transmit a data unit for each packet to the receive module (326) for further processing.

In one or more embodiments of the invention, the receive module (326) includes functionality to validate the QP state obtained for the packet. The receive module (326) includes functionality to determine whether the packet should be accepted for processing. In one or more embodiments of the invention, if the packet corresponds to an acknowledgement or an error message for a packet sent by the host channel adapter (300), the receive module includes functionality to update the completion module (316).

Additionally or alternatively, the receive module (326) includes a queue that includes functionality to store data units waiting for one or more reference to buffer location(s) or waiting for transmission to a next module. Specifically, when a process in a virtual machine is waiting for data associated with a QP, the process may create receive queue entries that reference one or more buffer locations in host memory in one or more embodiments of the invention. For each data unit in the receive module, the receive module includes functionality to identify the receive queue entries from a host channel adapter cache or from host memory, and associate the identifiers of the receive queue entries with the data unit.

In one or more embodiments of the invention, the descriptor fetch module (328) includes functionality to obtain descriptors for processing a data unit. For example, the descriptor fetch module may include functionality to obtain descriptors for a receive queue, a shared receive queue, a ring buffer, and the completion queue (CQ).

In one or more embodiments of the invention, the receive queue entry handler module (330) includes functionality to obtain the contents of the receive queue entries. In one or more embodiments of the invention, the receive queue entry handler module (330) includes functionality to identify the location of the receive queue entry corresponding to the data unit and obtain the buffer references in the receive queue entry. In one or more embodiments of the invention, the receive queue entry may be located on a cache of the host channel adapter (300) or in host memory.

In one or more embodiments of the invention, the DMA validation module (332) includes functionality to perform DMA validation and initiate DMA between the host channel adapter and the host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (332) includes functionality to initiate DMA with host memory when the DMA is validated.

Figure 4:
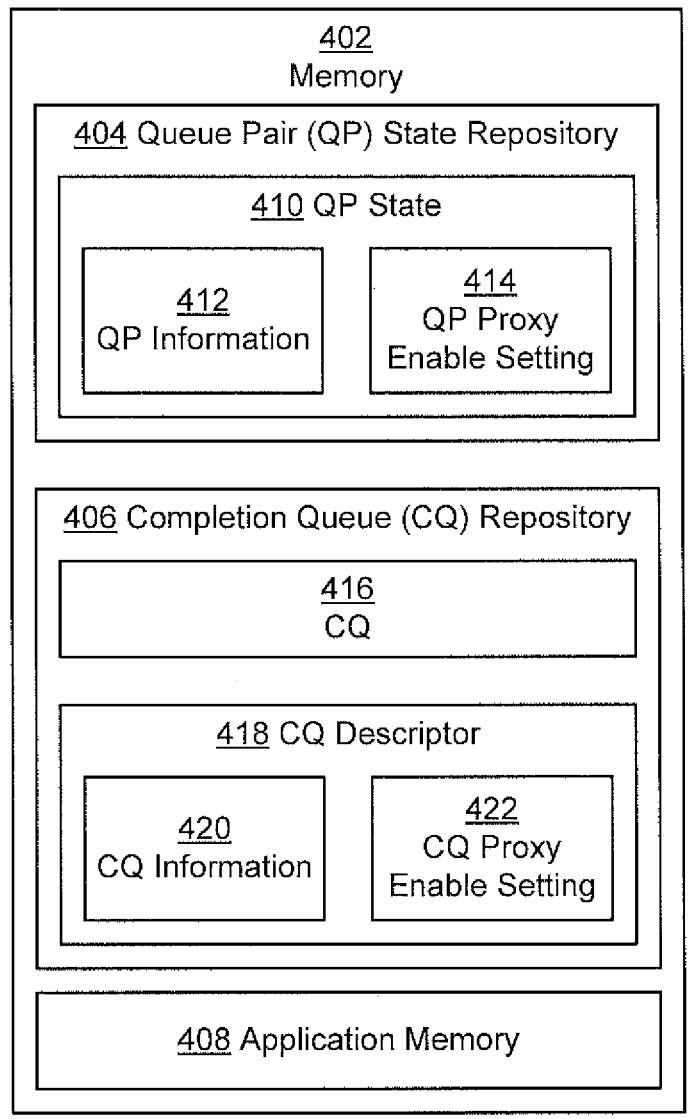
FIG. 4 shows a schematic diagram of memory in one or more embodiments of the invention.

FIG. 4 shows a schematic diagram of memory (402) in one or more embodiments of the invention. The memory (402) shown in FIG. 4 corresponds to memory of the host discussed above, FIG. 1, and FIG. 2 in one or more embodiments of the invention. The memory (402) may be persistent storage, cache, flash memory, read only memory (ROM), random access memory (RAM), or any other type of memory. Portions of the memory (402) or copies thereof may be stored on the HCA without departing from the scope of the invention. As shown in FIG. 4, the memory (402) includes a QP state repository (404), a CQ repository (406), and application memory (408). Memory (402) may include additional or different components without departing from the scope of the invention. Each of these components is discussed below.

In general, in one or more embodiments of the invention, a repository (e.g., QP context state repository (404), CQ repository (406)) is any type of storage unit and/or device (e.g., a file system, database, collection of tables, or any other storage mechanism) for storing data. Further, a repository may include multiple different storage units and/or devices.

In one or more embodiments of the invention, a QP state repository (404) corresponds to a repository for storing QP states (e.g., QP state (410)). Although FIG. 4 shows a single QP state (410), multiple QP states may be in the QP state repository (404) without departing from the scope of the invention. Specifically, in one or more embodiments of the invention, the QP state repository (404) stores a separate and unique QP state for each QP used by the host. The QP state includes information about the QP. Specifically, the QP state includes QP information (412) and a QP proxy enable setting (414). The QP proxy enable setting (414) is a configuration parameter that defines whether the QP is a proxy QP. In one or more embodiments of the invention, the QP proxy enable setting (414) may be a bit or any other mechanism for indicating whether the QP is a proxy QP. If the QP proxy enable setting (414) is set, then work requests for the QP are examined to determine whether the work requests should be processed by the proxy CPU.

QP information (412) includes other information about the QP state. For example, the QP information may include status and control information. For example, the QP information may include status and control information about the send queue and receive queue corresponding to the QP, the number of pending requests, size of the send queue, a QP number for the remote node (i.e., the node with which the application is communicating using the QP), one or more sequence numbers (e.g., send queue sequence number, CQ sequence number), index to a CQ descriptor (418) (discussed below), acknowledgement timeout period, and parameters for whether other actions are enabled for the QP.

A CQ repository (406) is a repository that stores CQ (416) and CQ descriptors (418) for one or more QP. Specifically, each QP may have a separate and unique corresponding CQ (416) and CQ descriptor (418). The CQ (416) is any data structure that includes functionality to store completions. In one or more embodiments of the invention, the CQ (416) may be implemented as a ring buffer. A completion is an indication to an application executing on the host that an action occurred on the HCA for the QP corresponding to the application. Specifically, a completion includes a sequence number, an operation code, and zero or more parameters. The sequence number indicates the order of a communication with respect to other communications of a QP. The operation code indicates to the application what the application needs to perform (e.g., that data is in memory, that no operation (i.e., no-op) needs to be performed, or other actions). The optional parameter(s) provide parameters for the operation code, such as location in memory in which the data is store, a reference to the receive queue, or other operation.

For example, a receive completion indicates that a message has been received from the network and processed by the HCA for the QP. In one or more embodiments of the invention, processing the message may include performing remote direct memory access (RDMA) to store data in the message in host memory associated with the application, transmitting the message to the receive queue of the QP, or performing other such processing. In such a scenario, the receive completion may indicate that new data is waiting for processing by the responder application. Processing the message may include performing, by the proxy CPU, a work request specified by the message, on behalf of the responder application, and requested by a remote requestor application. In such a scenario, the receive completion may be a no-op and a sequence number for the message. The no-op may indicate that a message was received, but the responder application does not need to perform any action for the message.

By way of another example, a send completion to a requester application indicates that a work request originating from the requester application successfully completed. Specifically, the send completion indicates that the message is sent. Such send completion may be created when the message is transmitted and/or when an acknowledgement is received from the receiving system.

The CQ descriptor (418) corresponding to a CQ (416) stores information about the corresponding CQ (416). The CQ descriptor (418) includes a CQ proxy enable setting (422) and CQ information (420) in one or more embodiments of the invention. The CQ proxy enable setting (422) is a configuration parameter that defines whether the CQ (416) is a proxy CQ. In one or more embodiments of the invention, the CQ proxy enable setting (422) may be a bit or any other mechanism for indicating whether the CQ (416) is a proxy CQ. If the CQ proxy enable setting (422) is set, then completions for the CQ (416) are routed to the proxy CPU. By routing all completions to the proxy CPU regardless of whether the corresponding work request is offloaded to the proxy CPU, embodiments maintain the expected ordering of completions by sequence number of the work request for the application. In other words, completions for work requests that take more time because of being offloaded to the proxy CPU are not behind completions for later work requests that are not offloaded in one or more embodiments of the invention.

CQ information (420) corresponds to other control and status information about the CQ. For example, CQ information (420) may include a consumer pointer to the CQ indicating the last entry in the CQ read, a producer pointer in the CQ indicating the last entry in the CQ received, a sequence number corresponding to last work request that had a completion added, and/or any other information about the CQ.

Continuing with the memory (402) of FIG. 4, an application memory (408) includes functionality to store data for an application. For example, the application memory (408) may include packet payload data to send on the network and/or data received from the network. The packet payload data for each packet of a message forms a work request. In other words, when the complete message is received (i.e., all the packets of the message are received), the complete message is a work request, which may be processed by the proxy CPU.

Figure 5:
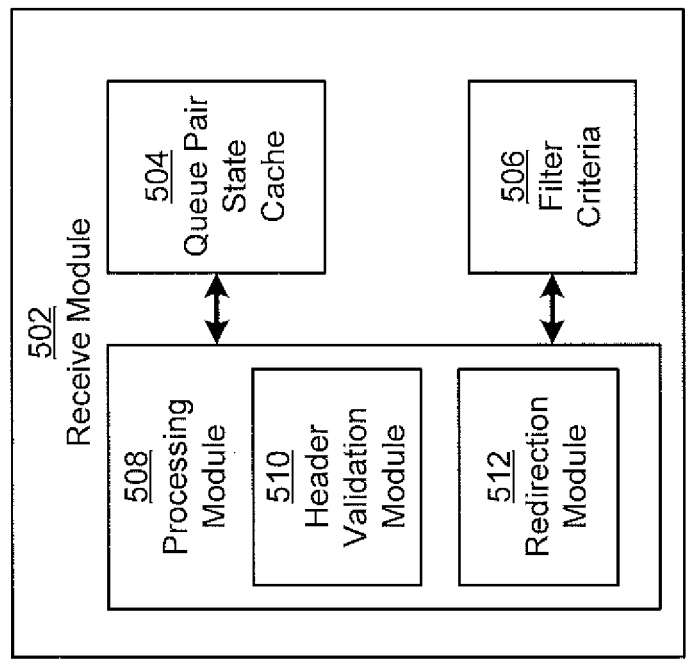
FIG. 5 shows a schematic diagram of a receive module in one or more embodiments of the invention.

FIG. 5 shows a schematic diagram of the receive module (502) discussed above and in FIG. 3 in one or more embodiments of the invention. As shown in FIG. 5, the receive module (502) includes a QP state cache (504), filter criteria (506), and a processing module (508). Each of these components is described below.

In one or more embodiments of the invention, the QP state cache (504) corresponds to a cache of QP states (discussed above with reference to FIG. 4). Specifically, the QP state cache (504) includes a portion of the QP states that are stored in memory. The portion of the QP states may correspond to QPs currently being processed by the HCA. In one or more embodiments of the invention, for each QP state in the QP state cache, only a subset of the QP state used by the receive module is stored. In one or more embodiments of the invention, the subset of the QP state includes the QP proxy enable settings for the QP.

In one or more embodiments of the invention, the filter criteria (506) includes one or more criterion for filtering which work requests are redirected to the proxy CPU. For example, the one or more filter criterion may include the amount of processing to complete the work request, the type of work request, the size of the work request (e.g., size of the payload(s)), number of packets in the message, and other information. The type of the work request specifies what operations need to be performed to complete the work request. For example, the operation may be to obtain a lock on one or more memory locations for a requester application. As another example, the operation may be to perform calculations on or otherwise process data in host memory.

Although FIG. 5 shows the filter criteria as separate from the QP state cache (504), the filter criteria may be stored in the QP state cache. Specifically, the filter criteria may be a part of the QP information for each particular QP. In such a scenario, the filter criteria may be specific to the QP.

Continuing with FIG. 5, the processing module (508) includes functionality to perform the actions of the receive module (502). Specifically, the processing module (508) corresponds to the hardware of the receive module (502) that performs the functionality of the receive module in one or more embodiments of the invention. In one or more embodiments of the invention, the processing module includes a header validation module (510) and a redirection module (512).

The header validation module (510) is hardware or firmware that includes functionality to validate the header field of an incoming packet from the network. Specifically, the header validation module (510) includes functionality to obtain the QP state of the QP specified in the packet and validate the header against the QP state. The validation determines whether the packet should be accepted for processing by the HCA. Further, the header validation module (510) determines the destination of the packet.

The redirection module (512) is hardware or firmware that includes functionality to determine whether to redirect the packet to the proxy CPU. Specifically, the redirection module (512) includes functionality to access the QP state cache (504) and determine whether the QP of the packet is a proxy QP. In one or more embodiments of the invention, the redirection module (512) further includes functionality to access the filter criteria (506) and determine whether the packet satisfies the filter criteria. The redirection module (512) further includes functionality to transmit packets to the proxy CPU or through normal processing channels to the application based on the results of the determinations.

Figure 6:
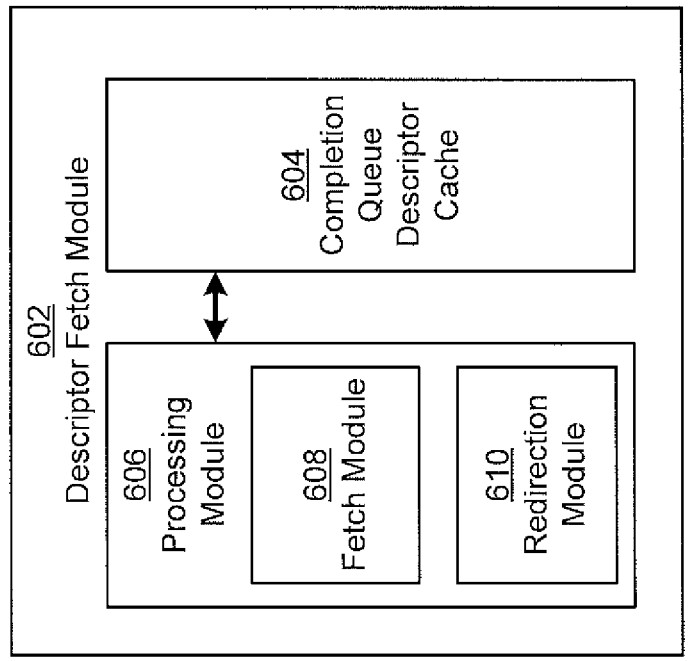
FIG. 6 shows a schematic diagram of a descriptor fetch module in one or more embodiments of the invention.

FIG. 6 shows a schematic diagram of the descriptor fetch module (602) discussed above and in FIG. 3 in one or more embodiments of the invention. As shown in FIG. 6, the descriptor fetch module (602) includes a CQ descriptor cache (604) and a processing module (606). Both of these components are described below.

In one or more embodiments of the invention, the CQ descriptor cache (604) corresponds to a cache of CQ descriptors (discussed above with reference to FIG. 4). Specifically, the CQ descriptor cache (604) includes a portion of the CQ descriptors that are stored in memory. The portion of the CQ descriptors may correspond to QPs currently being processed by the HCA. In one or more embodiments of the invention, for each CQ descriptor in the CQ descriptor cache, only a subset of the CQ descriptor used by the descriptor fetch module is stored. In one or more embodiments of the invention, the subset of the CQ descriptor includes the CQ proxy enable settings for the CQ corresponding to the QP.

Continuing with FIG. 6, the processing module (606) includes functionality to perform the actions of the descriptor fetch module (602). Specifically, the processing module (606) corresponds to the hardware of the descriptor fetch module that performs the functionality of the descriptor fetch module in one or more embodiments of the invention. In one or more embodiments of the invention, the processing module includes a fetch module (608) and a redirection module (610).

The fetch module (608) is hardware or firmware that includes functionality to fetch from memory and cache in the corresponding locations, not necessarily on the descriptor fetch module, queue descriptors used to process a packet. The queue descriptors may include descriptors for one or more of a receive queue, a shared receive queue, a ring buffer, and the CQ.

The redirection module (610) is hardware or firmware that includes functionality to determine whether to redirect the completion to the proxy CPU. Specifically, the redirection module (610) includes functionality to access the CQ descriptor cache (604) and determine whether the CQ is a proxy CQ. The redirection module (610) further includes functionality to transmit the completion to the proxy CPU or through normal processing channels to the application based on the results of the determinations.

Figure 7:
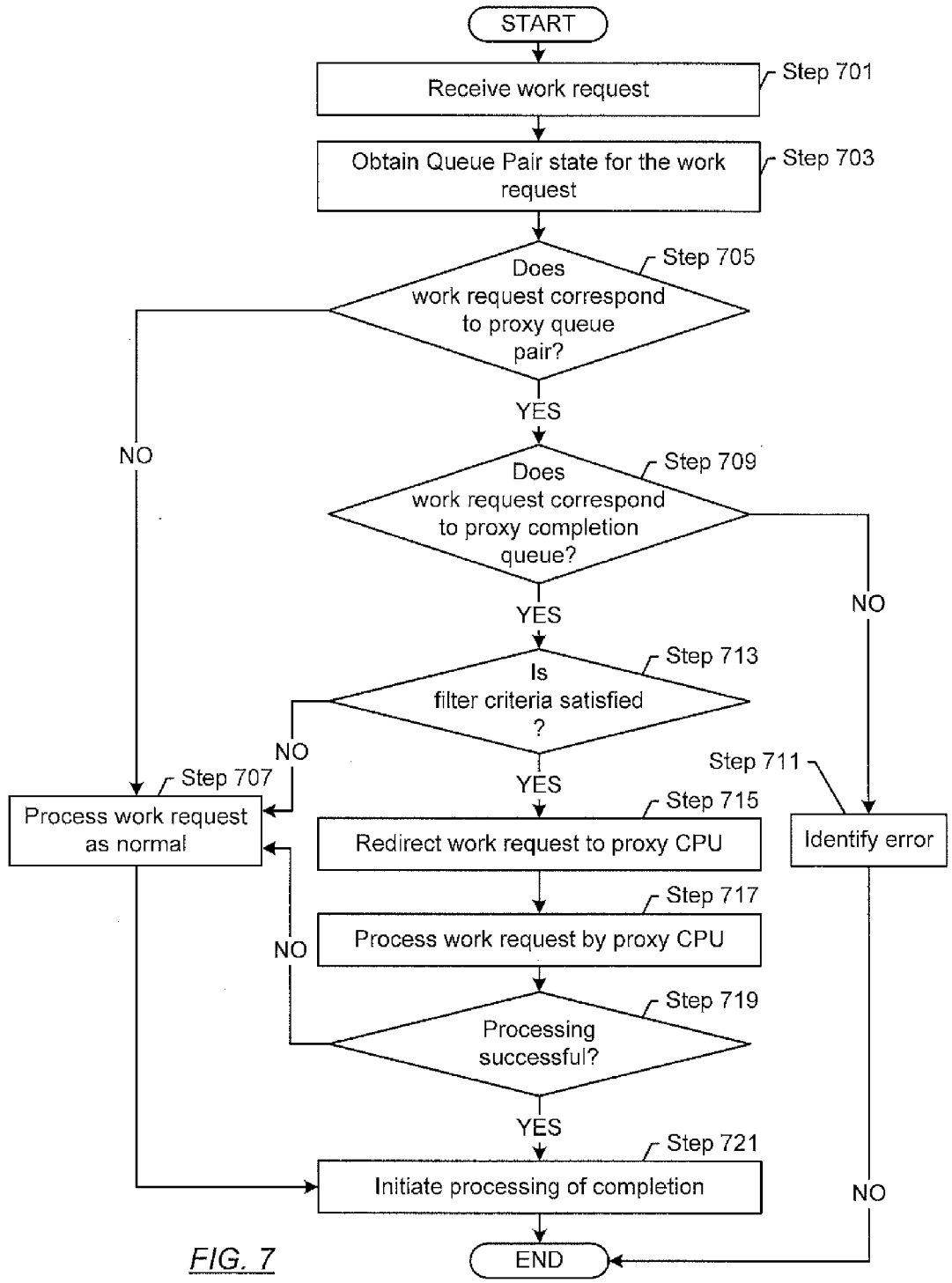
FIGS. 7 and 8 show flowcharts in one or more embodiments of the invention.
Figure 8:
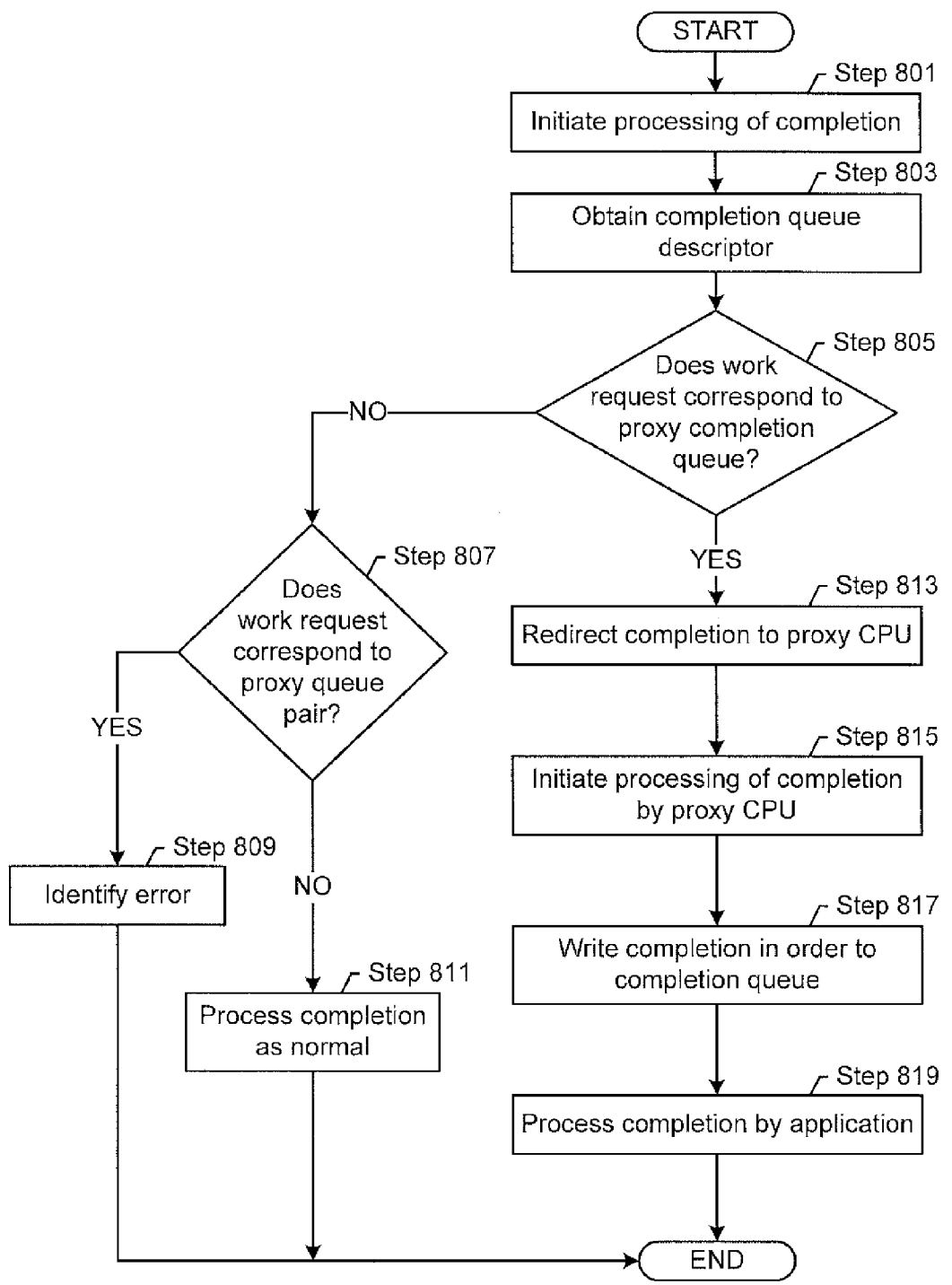
Figure 9:
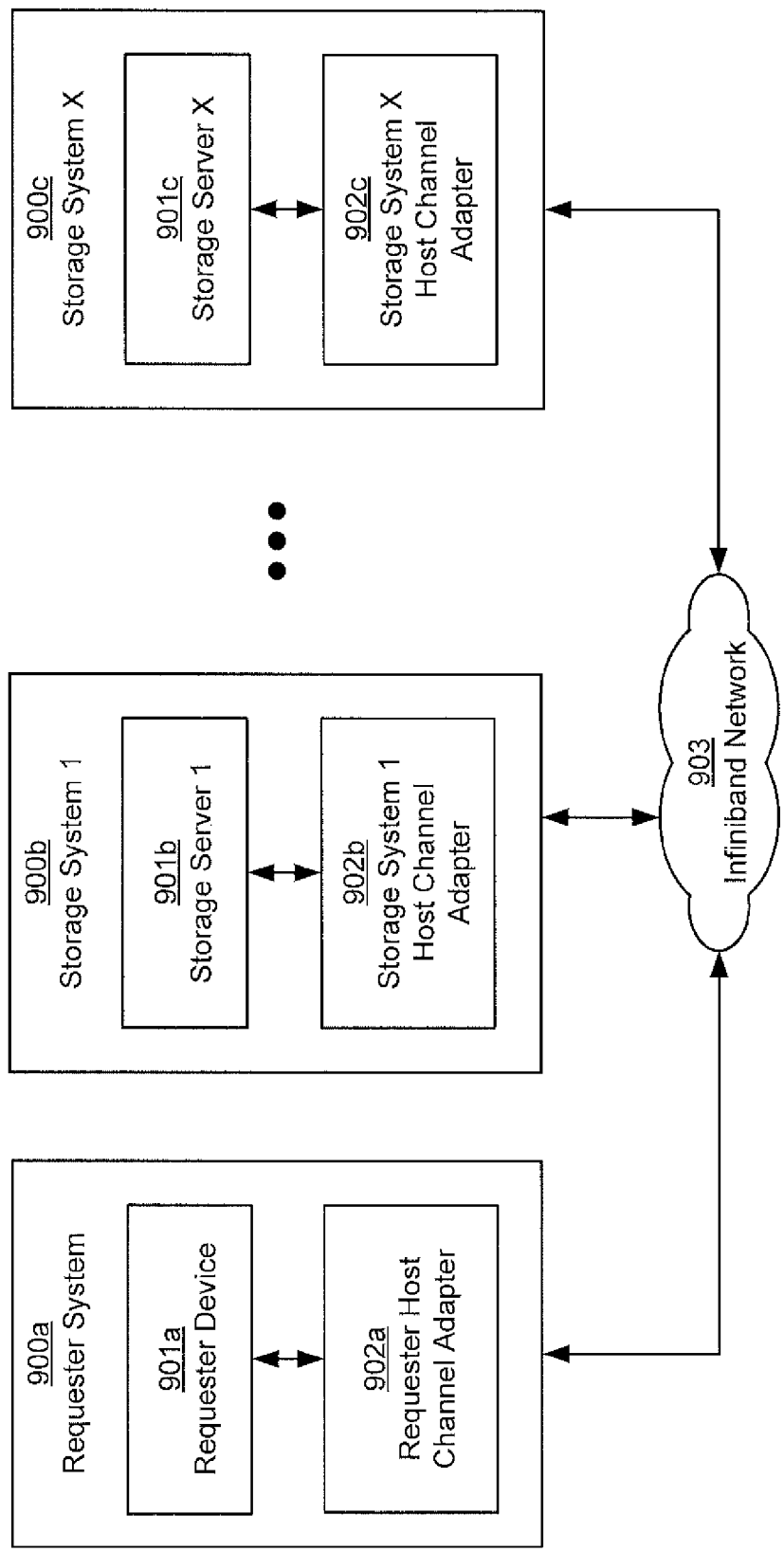
FIG. 9 shows an example in one or more embodiments of the invention.

FIGS. 7 and 8 show flowcharts in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Further, although FIGS. 7 and 8 show performing a sequence of determination steps in a particular order, two or more of the determination steps may be performed in parallel, in a different order, or omitted without departing from the scope of the claims.

FIG. 7 shows a flowchart for processing a work request in one or more embodiments of the invention. In one or more embodiments of the invention, the work request may be from the network or for transmission on the network. In other words, the application on the host may be a responder application or a requester application, respectively.

In 701, the work request is received in one or more embodiments of the invention. In one or more embodiments of the invention, the work request may be received from a network or received from the host. Receiving a work request from the host is discussed in U.S. patent application Ser. No. 12/149,436, which is incorporated herein by reference. In one or more embodiments of the invention, the work request corresponds to a command as described in U.S. patent application Ser. No. 12/149,436. In one or more embodiments of the invention, receiving the work request from the network includes the work request being received on the Infiniband® ports. For a work request received from the network, the work request may include one or more packets.

In 703, the QP state is obtained for the work request in one or more embodiments of the invention. Obtaining the QP state may be performed by accessing the work request and identifying the QP referenced in the work request. In one or more embodiments of the invention, each work request includes a sequence number and an identifier of the QP. The identifier of the QP may be an identifier of a send queue for work requests corresponding to sending on the network, a receive queue for work requests originating from the network, or a separate identifier. Based on the identifier, a determination may be made whether the QP state is already cached on the HCA. If the QP state is already cached, then the QP state is obtained from cache. If the QP state is not cached, then the QP state is obtained from memory on the host. Obtaining the QP state from memory may include sending a direct memory access (DMA) request to obtain the QP state from the QP state repository. In one or more embodiments of the invention, for work requests received from the network, the receive module obtains the QP state in one or more embodiments of the invention. For work requests received from the host, the QP fetch module obtains the QP state in one or more embodiments of the invention. Other modules may obtain the QP state without departing from the scope of the invention.

In 705, a determination is made whether the work request corresponds to a proxy QP. In particular, the QP proxy setting is accessed in the QP state. If the QP proxy setting is set, then the work request corresponds to a proxy QP. If the QP proxy setting is not set, then the work request does not correspond to a proxy QP.

If the work request does not correspond to a proxy QP, then the work request is processed as normal, in one or more embodiments of the invention in Step 707. Specifically, the work request is processed by the HCA to send a message to the network or to send the work request for processing by the application. Below is a description of how the work request may be processed as normal in one or more embodiments of the invention. Additional or alternative methods may be used to process the work request without departing from the scope of the claims.

In one or more embodiments of the invention, if the work request is for sending a message, processing the work request may include one or more of the following actions. If the work request includes packet data, then the packet data is read from the work request. If the work request specifies one or more locations in host memory, then the location(s) in host memory to read are identified from the work request in one or more embodiments of the invention. DMA may be performed to obtain the packet data. A DMA module on the HCA may identify one or more locations in host memory that are specified in the packet data, obtains the packet data from the one or more locations in host memory, and stores the packet data into buffers. In one or more embodiments of the invention, as part of obtaining the packet data, the DMA may perform validation to ensure that the host process sending the work request has necessary permissions to obtain the packet data. Regardless of whether the DMA is required, the packets are generated from the packet data. The generating of the packets may include performing various levels of identification and validation, such as validating the send queue sending the packet(s) and the receive queue receiving the packet(s). The packets are issued to the port for sending on a network in one or more embodiments of the invention. Further, a completion is initiated as described below and in FIG. 8.

For incoming work requests, processing the work requests may include performed as follows. Based on the type of work request, location(s) in host memory to store data are identified. If the work request is a message, then the locations may be locations associated with the responder application and identified as the receive queue from the QP. If the work request is for RDMA, then the locations may be specified in the work request. Validation is performed to confirm that the process sending the work request has permissions to access the location(s) in host memory. Specifically, for example, the validation may be based on the QP. If validated, then DMA is performed with the host memory to store or retrieve data in the specified location(s) of host memory. Further, a completion is initiated as described below and in FIG. 8.

Continuing with FIG. 7, when the work request corresponds to a proxy QP, in Step 709, a determination is made whether the work request corresponds to a proxy CQ in one or more embodiments of the invention. Specifically, the CQ descriptor is accessed. Obtaining the CQ descriptor may be performed by accessing the work request and identifying the QP referenced in the work request. Based on the QP, a determination may be made whether the CQ descriptor is already cached on the HCA. If the CQ descriptor is already cached, then the CQ descriptor is obtained from the cache. If the CQ descriptor is not cached, then the CQ descriptor is obtained from memory. Obtaining the CQ descriptor from memory may include sending a DMA request to obtain the CQ descriptor from the CQ descriptor repository. In one or more embodiments of the invention, descriptor fetch module obtains the CQ descriptor. Other modules may obtain the QP state without departing from the scope of the invention. Further, the CQ proxy setting is accessed in the QP state. If the CQ proxy setting is set, then the work request corresponds to a proxy CQ. If the CQ proxy setting is not set, then the work request does not correspond to a proxy CQ. If the work request does not correspond to a proxy CQ, but does correspond to a proxy QP, then an error is identified in Step 711. When the error is identified, the work request may be discarded and/or an error message may be transmitted to the host (e.g., a control application or another application on the host).

Further, in Step 713, a determination is made whether the filter criteria is satisfied in one or more embodiments of the invention. Determining whether filter criteria is satisfied may be performed by comparing the work request to the one or more filter criterion in the filter criteria. For example, the size of the payload in the work request may be compared to determine whether the work request complies with any size requirements specified for the proxy QP. By way of another example, if a single packet message has a size which is below a programmable size threshold, then the single packet message may be offloaded.

Possible filter criteria may be based on inspecting the header of the packet. Specifically, a determination is made as to whether information in the header matches the filter criteria. If so, the work request is offloaded. For example, the work request may be offloaded when an operation code in the work request specifies a permitted operation for offloading in the filter criteria. As another example, the filtering criteria may be based on specific addresses in RDMA packets, or particular Remote Keys (R_Keys) used for accessing the RDMA addresses. By way of another example, for non-connection based QPs (Unreliable Datagram (UD)), when the QP number or other information about the source of the packet (SLID/SGID) or the Service Level that the packet used to cross the network matches a pre-specified information, the packet may be offloaded.

Other possible filter criteria may be based on inspecting the payload of the packet. Specifically, a determination is made as to whether the payload or attributes thereof matches the filter criteria. If so, the work request is offloaded.

For example, Infiniband (IB) payload often carries other protocols tunneled through the IB network. Ethernet over IB and IPoIB are two examples. If the packets are Ethernet or Internet protocol (IP) packets, a large number of layered protocols may exist as well. In support of the various protocols, Ethernet and IP packet classifiers may distinguish between L2, L3 and L4 packet types. The result of the classification may be used as part of the filter criteria (e.g. only TCP packets). Additionally or alternatively, a number of fields may be extracted from the packet headers (e.g., of Ethernet or IP packets) and use them for various checks, similar to a firewall. The extracted fields may be part of the filter criteria as well (e.g., only transmission control protocol (TCP) packets using TCP port 100).

The various possible filtering may be used with custom circuitry specific to the packet type, or with more generic circuitry which provides a programmable filter on a bitwise basis, such as a ternary content addressable memory (TCAM). For example, with a TCAM, each entry in the TCAM has two fields: an N bit value and an N bit mask. When a packet is received, the first N bits of the packet are then presented to the TCAM. Each bit is compared against the corresponding bit in the TCAM value. If the two bits are equal, then those bits match. If the two bits are not equal, then they do not match. If the mask bit is set, then the bit is ignored. If all non-ignored bits match, then the packet is determined to match the filter criteria. A policy may exist for the TCAM whereby matched packets go to the Proxy CPU and unmatched do not, or matched packets do not go to the proxy CPU and unmatched do.

Another criteria may be based on the relative load of the proxy CPU. Specifically, if the proxy CPU has too much work, the proxy CPU might be in the critical path and slow down other applications in one or more embodiments of the invention. To avoid or alleviate the problem of the critical path, a load detection logic may be used which would then transition the filter machine to a 'no-offload mode' where the HCA stops offloading packets which otherwise match the filter criteria until the proxy CPU has managed to catch up.

Above are a few example techniques and criteria for filtering. Other techniques and filtering criteria may be used without departing from the scope of the invention.

If the filter criteria is not satisfied, then the work request is processed as normal in Step 707 and as discussed above. If the filter criteria is satisfied, then the work request is processed by the proxy CPU in Step 717. Specifically, the work request is routed to the proxy CPU rather than, or in addition, to processing the work request on the host channel adapter. Specifically, the work request may go through all or part of the normal processing on the HCA. For incoming work requests, rather than notifying the application, the work request is transmitted to the proxy CPU. The proxy CPU executes the offloaded instructions on the work request. Specifically, the instructions specifying what actions to perform may be in memory on the HCA for execution by the proxy CPU. Accordingly, the proxy CPU performs the actions. For example, the proxy CPU may perform one or more of the following access host memory or other local storage (disk) through reads, writes or atomic operations, send packets to other locations in the network, perform local calculations on the contents of the packet or the contents of memory or both, and/or send response packets to the original requester.

In Step 719, a determination is made as to whether the processing of the work request is successful. For example, while processing the work request, the proxy CPU may encounter an error. As another example, the proxy CPU may determine that a work request is too complicated to process. The determination may be based on rules maintained by the proxy CPU. If the processing of the work request is not successful, then the work request is processed as normal in Step 707 and as discussed above. Specifically, any processing of the work request performed by the proxy CPU is reversed.

If the processing of the work request is successful or after normal processing of the work request, processing of the completion is initiated in Step 721. For example, a notification may be sent to the completion module to initiate the completion.

FIG. 8 shows a flowchart for performing completion processing in one or more embodiments of the invention. In Step 801, processing of the completion is initiated. Step 801 may correspond to Step 721 discussed above.

In Step 803, a CQ descriptor is obtained in one or more embodiments of the invention. In Step 805, a determination is made whether the work request corresponds to a proxy CQ. Steps 803 and 805 may be performed, for example, as discussed above with reference to Step 709.

In Step 807, if the work request does not correspond to a proxy CQ, then a determination is made whether the work request corresponds to a proxy QP. Step 807 may be performed, for example, as discussed above with reference to Steps 703 and 705.

If the work request corresponds to a proxy QP and not to a proxy CQ, then an error is identified in Step 809. When the error is identified, the work request may be discarded and/or an error message may be transmitted to the host (e.g., a control application or another application on the host).

If the work request does not correspond to a proxy QP or a proxy CQ, then the completion is processed as normal in Step 811. Specifically, a completion is generated and added to the CQ corresponding to the application. Adding the completion may be performed using DMA with host memory. Further, adding the completion may include updating the CQ descriptor to indicate that a new completion is added.

Returning to Step 805, if the work request corresponds to a proxy CQ, then in Step 813, the completion is redirected to the proxy CPU. In Step 815, processing of the completion is initiated by the proxy CPU in one or more embodiments of the invention. When received by the proxy CPU, the proxy CPU buffers the completion until completions for work requests having preceding sequence number are written by the proxy CPU. In Step 817, the completion is written in order to the CQ in one or more embodiments of the invention. Writing the completion may be performed similar to the discussion above with the following exception. If the work request was processed by the proxy CPU, then the proxy CPU may change the completion from one specifying an instruction to a no-op, which indicates to the application that something was performed for the sequence number, and the application does not need to perform additional actions. Alternatively, if the proxy CPU only performs a subset of the actions performed by the application, then the proxy CPU may change the completion to indicate that only a remaining subset of actions needs to be performed.

In Step 819, the completion is processed by the application in one or more embodiments of the invention. Processing the completion may be performed using techniques known in the art. For completions that include no-ops, the application may merely update memory to indicate that the work request having the sequence number in the completion was received, but no processing on the part of the application needs to be completed.

The following example is for explanatory purposes only and not intended to limit the scope of the invention. In the following example, consider the scenario in which a distributed storage system, such as a distributed database, is accessed by one or more requester systems (900a). Specifically, the distributed storage system includes storage system 1 (900b) and storage system X (900c) as well as other storage systems (not shown). Each storage system (900b, 900c) includes a storage server (901b, 901c) and a host channel adapter (902b, 902c). The requester system (900a) includes a requester device (901a) and a requester host channel adapter (902a). An Infiniband® network (903) connects the host channel adapters.

Continuing with the example, to access and request manipulation of data, a requester application (not shown) on the requestor device (901a) first requests, via the requester host channel adapter (902b) to obtain a lock on the particular data in the storage server having the data. Then, the requester application requests data manipulation by a responder application (not shown) on the storage server.

In the example, consider the scenario in which the requester application issues the first request to storage system 1 (900b) for the lock and, then issues a second request, immediately, to perform the data manipulation if the lock is acquired. Further, in the example, the responder application offloads to a proxy CPU on storage system 1 host channel adapter (902a) to obtain locks for requester applications, but not to perform any data manipulation.

In the example, when the storage system 1 host channel adapter (902b) receives the first request, the storage system 1 HCA (902b) identifies that the QP and the CQ referenced in the first request are proxy QP and CQ, respectively. Further, the storage system 1 HCA (902b) determines that because the first request is to obtain a lock, the first request matches the filter criteria for transmitting the work request to the proxy CPU. Accordingly, the first request is a request for processing by the proxy CPU on the storage system 1 HCA (902b). Accordingly, the request is routed to the proxy CPU.

Continuing with the example, while the proxy CPU is in the process of obtaining the lock, the second request is received by the storage system 1 HCA (902b). Although the second request is for a proxy QP and proxy CQ, because the second request is for data manipulation, the second request does not match the filter criteria. Thus, the second request is processed as normal without being routed to the proxy CPU. In other words, the second request is processed by the storage system 1 HCA (902b) to be stored in the receive queue for processing by the responder application. Further, a completion for the second request (i.e., second completion) is generated. Because the second request is after the first request, the second request has a higher sequence number. Thus, the second completion has the higher sequence number. Further, because the CQ of the QP in the second request is a proxy CQ, the second completion is routed to the proxy CPU.

When the proxy CPU receives the second completion, the proxy CPU buffers the second completion based on the sequence number of the second request being greater than the first request and not having completed processing of the first request. After the proxy CPU completes processing the first request to acquire the lock, the proxy CPU writes a first completion for the first request to the CQ for the responder application. The first completion includes the sequence number of the first request and a no-op to indicate that the responder application does not need to perform any action. Only after the first completion is written, the proxy CPU writes the second completion for the second request. The second completion includes the sequence number of the second requests and indicates that a request is waiting to be processed by the responder application in the receive queue.

Accordingly, the responder application does nothing with the first request except update internal records. The responder application then performs the data manipulation requested in the second request because the lock was acquired in the first request. As shown in the example, by routing completions to the proxy CPU regardless of whether the corresponding requests were offloaded, embodiments ensure that completions are processed in order by the responder application.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for offloading work requests of a queue pair (QP), comprising:
   receiving, by a host channel adapter (HCA), a first work request identifying the QP, wherein the QP is associated with an application executing on a host connected to the HCA;
   making a first determination that the QP is a proxy QP;
   offloading, by the HCA, the first work request to a proxy central processing unit (CPU) based on the first determination and based on the first work request satisfying a filter criterion;
   receiving, by the HCA, a second work request identifying the QP;
   processing, by the HCA, the second work request without offloading based on the QP being a proxy QP and based on the first work request failing to satisfy the filter criterion;
   redirecting a first completion for the first work request and a second completion for the second work request to the proxy CPU based on the first determination; and
   processing, by the proxy CPU, the first completion and the second completion in order.

2. The method of claim 1, wherein the first work request is received from a network and is directed to the application, and wherein offloading the first work request comprises:
  redirecting the first work request to the proxy CPU; and
  performing, by the proxy CPU, operations of the application according to the first work request.

3. The method of claim 2, wherein processing the first completion and the second completion by the proxy CPU comprises:
  transmitting, for the first completion, a no-op instruction to a completion queue (CQ) in host memory located on the host, wherein the CQ is associated with the application; and
  transmitting, for the second completion, the second completion to the CQ.

4. The method of claim 2, wherein the operations of the application comprise obtaining, for a remote requestor, a lock on a portion of a distributed database, wherein the portion is located on the host.

5. The method of claim 1, wherein the filter criterion comprises a size of the work request.

6. The method of claim 1, wherein the first work request is received from the application, and wherein offloading the first work request comprises:
  redirecting the first work request to the proxy CPU; and
  performing, on the first work request, operations of an operating system executing on the host.

7. The method of claim 6, wherein processing the first completion and the second completion by the proxy CPU comprises transmitting the first completion and the second completion in order to a CQ in host memory located on the host, wherein the CQ is associated with the application.

8. The method of claim 1, further comprising:
  making a second determination that a CQ associated with the application is a proxy CQ,
  wherein redirecting the first completion and the second completion to the proxy CPU is further based on the second determination.

9. A host channel adapter (HCA) for offloading, comprising:
  a proxy central processing unit; a receive module for:
    receiving a first work request identifying a first queue pair (QP), wherein the first QP is associated with an application executing on a host connected to the HCA;
    making a first determination that the first QP is a proxy QP;
    redirecting the first work request to the proxy CPU on the HCA based on the first determination and based on the first work request satisfying a filter criterion;
    receiving a second work request identifying the first QP; and
    processing the second work request without redirecting to the proxy CPU based on the first determination and based on the first work request failing to satisfy the filter criterion;
  a completion module, stored in a memory and executed by the proxy central processing unit, for:
    generating a first completion for the first work request; and
    generating a second completion for the second work request; and a descriptor fetch module for:
    redirecting the first completion and the second completion to the proxy CPU based on the first determination,
  wherein the proxy CPU processes the first work request, the first completion, and the second completion.

10. The HCA of claim 9, wherein the receive module comprises:
  a header validation module for:
    obtaining a QP state for the first QP; and
    making the first determination based on a proxy bit being set in the QP state; and
  a redirection module for redirecting work requests to the proxy CPU.

11. The HCA of claim 9, wherein the descriptor fetch module comprises:
  a header validation module for:
    obtaining a CQ descriptor for a CQ corresponding to the first work request and the second work request; and
    making a second determination that the CQ is a proxy CQ based on a proxy bit being set in the CQ descriptor; and
  a redirection module for redirecting completions to the proxy CPU.

12. The HCA of claim 9, wherein the first work request is received from a network and is directed to the application, and wherein the proxy CPU performs operations of the application according to the first work request.

13. The HCA of claim 12, wherein processing the first completion and the second completion by the proxy CPU comprises:
  transmitting, for the first completion, a no-op instruction to a CQ in host memory located on the host, wherein the CQ is associated with the application; and
  transmitting, for the second completion, the second completion to the CQ.

14. The HCA of claim 12, wherein the operations of the application comprises obtaining, for a remote requestor, a lock on a portion of a distributed database, wherein the portion is located on the host.

15. The HCA of claim 12, wherein the proxy CPU is further configured to:
  make a second determination that processing of the first work request by the proxy CPU fails; and
  transmit the first work request to the application based on the second determination.

16. The HCA of claim 12, wherein the receive module is further configured to:
  receive a third work request identifying a second QP;
  make a second determination that the second QP is not a proxy QP; and
  process the third work request without redirecting to the proxy CPU based on the second determination.

17. The HCA of claim 16, wherein the descriptor fetch module is further configured to:
  obtain a third completion for the third work request;
  obtain a CQ descriptor for a CQ associated with the third work request; and
  generate an error when the CQ descriptor for the third work request indicates that the CQ is not a proxy CQ and when the QP is a proxy QP.

18. A system comprising:
  a host comprising a memory, a central processing unit, and an application; and
  a host channel adapter (HCA), connected to the host, for:
    receiving a first work request identifying a queue pair (QP), wherein the
  QP is associated with the application; making a first determination that the QP is a proxy QP;
    offloading the first work request to a proxy central processing unit (CPU) based on the first determination and based on the first work request satisfying a filter criterion;

receiving a second work request identifying the QP;
processing the second work request without offloading based on the QP being a proxy QP and based on the first work request failing to satisfy the filter criterion;
redirecting a first completion for the first work request and a second completion for the second work request to the proxy CPU based on the first determination; and
processing, by the proxy CPU, the first completion and the second completion in order.

19. The system of claim 18, wherein the first work request is received from a network and is directed to the application, and wherein offloading the first work request comprises:
   redirecting the first work request to the proxy CPU; and
   performing operations of the application by the proxy CPU according to the first work request.

20. The system of claim 19, wherein processing the first completion and the second completion by the proxy CPU comprises:
   transmitting, for the first completion, a no-op instruction to a CQ in host memory located on the host, wherein the CQ is associated with the application; and
   transmitting, for the second completion, the second completion to the CQ.

\* \* \* \* \*

UNITED STATES PATENT AND TRADEMARK OFFICE
CERTIFICATE OF CORRECTION

| | |
|---|---|
| PATENT NO. | : 9,069,633 B2 |
| APPLICATION NO. | : 13/721649 |
| DATED | : June 30, 2015 |
| INVENTOR(S) | : Manula et al. |

It is certified that error appears in the above-identified patent and that said Letters Patent is hereby corrected as shown below:

In the specification,

In column 7, line 15, delete "machine" and insert -- machine. --, therefor.

In column 8, line 4, delete "machine" and insert -- machine. --, therefor.

Signed and Sealed this
First Day of March, 2016

Michelle K. Lee
*Director of the United States Patent and Trademark Office*